US010353557B2

(12) United States Patent
Endo

(10) Patent No.: US 10,353,557 B2
(45) Date of Patent: Jul. 16, 2019

(54) GRAPHIC DRAWING DEVICE AND RECORDING MEDIUM STORING GRAPHIC DRAWING PROGRAM

(71) Applicant: CASIO COMPUTER CO., LTD., Shibuya-ku, Tokyo (JP)

(72) Inventor: Kota Endo, Hachioji (JP)

(73) Assignee: CASIO COMPUTER CO., LTD., Tokyo (JP)

(*) Notice: Subject to any disclaimer, the term of this patent is extended or adjusted under 35 U.S.C. 154(b) by 380 days.

(21) Appl. No.: 14/657,851

(22) Filed: Mar. 13, 2015

(65) Prior Publication Data

US 2015/0268845 A1    Sep. 24, 2015

(30) Foreign Application Priority Data

Mar. 19, 2014  (JP) .................. 2014-057245

(51) Int. Cl.
*G06F 3/048* (2013.01)
*G06F 3/0484* (2013.01)
*G06F 3/0482* (2013.01)
*G06T 11/60* (2006.01)
(Continued)

(52) U.S. Cl.
CPC ........ *G06F 3/04847* (2013.01); *G06F 3/0482* (2013.01); *G06F 3/04842* (2013.01); *G06F 3/04845* (2013.01); *G06F 3/04883* (2013.01); *G06T 11/203* (2013.01); *G06T 11/60* (2013.01); *G06T 2200/24* (2013.01)

(58) Field of Classification Search
CPC ...................................... G06F 3/048
See application file for complete search history.

(56) References Cited

U.S. PATENT DOCUMENTS

| 3,789,203 A | 1/1974 | Catherall et al. |
| 4,217,702 A | 8/1980 | Bennett |
| 4,794,553 A | 12/1988 | Watanabe et al. |
(Continued)

FOREIGN PATENT DOCUMENTS

| CN | 101030119 A | 9/2007 |
| JP | 06052278 A | 2/1994 |
(Continued)

OTHER PUBLICATIONS

Related U.S. Appl. No. 14/574,141, filed Dec. 17, 2014, First Named Inventor: Kota Endo, Title: "Graph Display Control Device, Electronic Device, Graph Display Method and Storage Medium Recording Graph Display Control Processing Program".
(Continued)

*Primary Examiner* — Xuyang Xia
(74) *Attorney, Agent, or Firm* — Holtz, Holtz & Volek PC

(57) ABSTRACT

A graphic drawing device includes a display unit and a processor. The processor executes a process includes: displaying on the display unit, a measurement item corresponding to at least one graphic part drawn on the display unit; displaying on the display unit, a slider identifier for setting a slider in a case that the displayed measurement item is a type capable of setting a slider for changing a value of the displayed measurement item; and displaying on the display unit, a slider for changing the value of the displayed measurement item according to an operation by a user with respect to the displayed slider identifier.

19 Claims, 10 Drawing Sheets

(51) Int. Cl.
*G06F 3/0488* (2013.01)
*G06T 11/20* (2006.01)

(56) References Cited

U.S. PATENT DOCUMENTS

| | | | |
|---|---|---|---|
| 5,136,690 A | 8/1992 | Becker et al. | |
| 5,289,205 A | 2/1994 | Torres | |
| 5,303,338 A | 4/1994 | Handa et al. | |
| 5,510,995 A | 4/1996 | Oliver | |
| 5,532,946 A | 7/1996 | Phipps et al. | |
| 5,539,427 A | 7/1996 | Bricklin et al. | |
| 5,539,867 A | 7/1996 | Handa et al. | |
| 5,553,225 A | 9/1996 | Perry | |
| 5,739,823 A | 4/1998 | Akaza et al. | |
| 5,778,329 A | 7/1998 | Officer et al. | |
| 5,825,355 A | 10/1998 | Palmer et al. | |
| 5,999,193 A | 12/1999 | Conley et al. | |
| 6,133,924 A | 10/2000 | Ito et al. | |
| 6,208,343 B1 | 3/2001 | Roth | |
| 6,256,595 B1* | 7/2001 | Schwalb | G06T 19/00 700/182 |
| 6,429,869 B1 | 8/2002 | Kamakura et al. | |
| 6,532,469 B1 | 3/2003 | Feldman et al. | |
| 6,549,923 B1 | 4/2003 | Sudoh | |
| 6,918,768 B2 | 7/2005 | Bardige et al. | |
| 6,922,816 B1 | 7/2005 | Amin et al. | |
| 6,941,359 B1 | 9/2005 | Beaudoin et al. | |
| 7,289,120 B2 | 10/2007 | Fukaya et al. | |
| 7,747,981 B2 | 6/2010 | Gray | |
| 7,765,491 B1 | 7/2010 | Cotterill | |
| 8,089,482 B1 | 1/2012 | Axelrod | |
| 8,259,115 B2 | 9/2012 | Okano | |
| 8,407,580 B2 | 3/2013 | Gray et al. | |
| 8,413,116 B2 | 4/2013 | Gray | |
| 9,098,858 B2 | 8/2015 | Xia et al. | |
| 9,202,433 B2 | 12/2015 | Webb et al. | |
| 9,217,785 B2 | 12/2015 | Furudate | |
| 9,507,495 B2 | 11/2016 | Johansson et al. | |
| 2002/0016697 A1 | 2/2002 | Nishigaki et al. | |
| 2003/0182333 A1 | 9/2003 | Good et al. | |
| 2004/0083247 A1 | 4/2004 | Koont | |
| 2004/0114258 A1 | 6/2004 | Harris, III et al. | |
| 2004/0135826 A1 | 7/2004 | Pickering | |
| 2004/0227738 A1 | 11/2004 | Sudoh | |
| 2005/0071785 A1 | 3/2005 | Chadzelek et al. | |
| 2005/0108234 A1 | 5/2005 | Oksanen et al. | |
| 2006/0204139 A1 | 9/2006 | Hayashi | |
| 2006/0253795 A1 | 11/2006 | Titov et al. | |
| 2007/0046674 A1 | 3/2007 | Sudoh | |
| 2007/0073705 A1 | 3/2007 | Gray | |
| 2007/0153001 A1 | 7/2007 | Yu et al. | |
| 2007/0195093 A1 | 8/2007 | Springer et al. | |
| 2007/0198620 A1 | 8/2007 | Nilakantan et al. | |
| 2007/0298389 A1 | 12/2007 | Yu et al. | |
| 2008/0143746 A1 | 6/2008 | Irons | |
| 2008/0250347 A1 | 10/2008 | Gray et al. | |
| 2008/0256489 A1 | 10/2008 | Maurer et al. | |
| 2009/0006995 A1 | 1/2009 | Error et al. | |
| 2009/0063206 A1 | 3/2009 | Payne et al. | |
| 2009/0073173 A1* | 3/2009 | Nakamura | G06T 11/203 345/441 |
| 2009/0102846 A1 | 4/2009 | Flockermann et al. | |
| 2009/0115782 A1 | 5/2009 | Irons et al. | |
| 2009/0164886 A1 | 6/2009 | Shah et al. | |
| 2009/0281645 A1 | 11/2009 | Kitahara et al. | |
| 2009/0307587 A1 | 12/2009 | Kaneko | |
| 2010/0070931 A1 | 3/2010 | Nichols | |
| 2010/0099462 A1 | 4/2010 | Baek et al. | |
| 2010/0156830 A1 | 6/2010 | Homma et al. | |
| 2010/0231596 A1 | 9/2010 | Matsuda | |
| 2011/0004864 A1 | 1/2011 | Gray | |
| 2011/0043517 A1 | 2/2011 | Schneider et al. | |
| 2011/0227946 A1 | 9/2011 | Yoshizawa et al. | |
| 2011/0246943 A1 | 10/2011 | Fujibayashi | |
| 2011/0254862 A1 | 10/2011 | Okano | |
| 2011/0283188 A1 | 11/2011 | Farrenkopf et al. | |
| 2012/0030626 A1* | 2/2012 | Hopkins | G06F 3/04847 715/833 |
| 2012/0050328 A1 | 3/2012 | Karoji | |
| 2012/0159370 A1 | 6/2012 | Rode et al. | |
| 2012/0306879 A1 | 12/2012 | Yokoyama | |
| 2013/0050064 A1 | 2/2013 | Okano | |
| 2013/0097551 A1 | 4/2013 | Hogan | |
| 2013/0154645 A1 | 6/2013 | Furudate | |
| 2013/0235069 A1 | 9/2013 | Ubillos et al. | |
| 2013/0268263 A1 | 10/2013 | Park et al. | |
| 2014/0075380 A1* | 3/2014 | Milirud | G06F 11/323 715/810 |
| 2014/0096056 A1 | 4/2014 | Latzina | |
| 2014/0253542 A1 | 9/2014 | Jung et al. | |
| 2014/0282252 A1 | 9/2014 | Edwards et al. | |
| 2014/0317570 A1 | 10/2014 | Endo | |
| 2014/0359516 A1* | 12/2014 | O'Donoghue | G06F 3/0483 715/776 |
| 2014/0365947 A1 | 12/2014 | Karoji | |
| 2015/0170372 A1 | 6/2015 | Rubins et al. | |
| 2015/0187105 A1 | 7/2015 | Endo et al. | |
| 2015/0187106 A1 | 7/2015 | Endo | |
| 2015/0310646 A1 | 10/2015 | Karoji et al. | |
| 2016/0004423 A1 | 1/2016 | Springer et al. | |
| 2016/0041944 A1 | 2/2016 | Karoji | |
| 2016/0077725 A1 | 3/2016 | Maeda | |

FOREIGN PATENT DOCUMENTS

| | | |
|---|---|---|
| JP | H06175977 A | 6/1994 |
| JP | 08179749 A | 7/1996 |
| JP | 09050273 A | 2/1997 |
| JP | 09185586 A | 7/1997 |
| JP | 09198224 A | 7/1997 |
| JP | 09282475 A | 10/1997 |
| JP | H09282476 A | 10/1997 |
| JP | 11184822 A | 7/1999 |
| JP | 11328279 A | 11/1999 |
| JP | 2001350731 A | 12/2001 |
| JP | 2002117084 A | 4/2002 |
| JP | 2004199260 A | 7/2004 |
| JP | 2004206541 A | 7/2004 |
| JP | 2004326691 A | 11/2004 |
| JP | 2005107862 A | 4/2005 |
| JP | 2005107908 A | 4/2005 |
| JP | 2005107987 A | 4/2005 |
| JP | 2005182125 A | 7/2005 |
| JP | 2005339405 A | 12/2005 |
| JP | 2006120173 A | 5/2006 |
| JP | 2011181050 A | 9/2011 |
| JP | 2011185911 A | 9/2011 |
| JP | 2012014440 A | 1/2012 |
| JP | 2012203605 A | 10/2012 |
| JP | 2013045147 A | 3/2013 |
| JP | 2013050746 A | 3/2013 |
| JP | 2013144095 A | 7/2013 |
| JP | 2013178846 A | 9/2013 |
| JP | 2014048718 A | 3/2014 |
| WO | 2004029791 A2 | 4/2004 |

OTHER PUBLICATIONS

Related U.S. Appl. No. 14/582,129, filed Dec. 23, 2014, First Named Inventor: Kota Endo, Title: "Graph Display Control Apparatus, Electronic Device, Graph Display Method, and Storage Medium Storing Graph Display Control Process Program".

U.S. Appl. No. 14/854,773; First Named Inventor: Naoya Maeda; Title: "Figure Display Apparatus, Figure Display Method, and Storage Medium Storing Figure Display Program"; filed Sep. 15, 2015.

U.S. Appl. No. 14/298,586; First Named Inventor: Kosuke Karoji; Title: "Electronic Apparatus, Graph Display Method and Computer Readable Medium"; filed Jun. 6, 2014.

U.S. Appl. No. 14/254,594; First Named Inventor: Kota Endo; Title: "Graph Display Device, Graph Display Method and Computer-

(56) References Cited

OTHER PUBLICATIONS

Readable Medium Recording Control Program"; filed Apr. 16, 2014.
U.S. Appl. No. 14/807,702; First Named Inventor: Kosuke Karoji; Title: "Graph Display Apparatus, Graph Display Method and Program Recording Medium" filed Jul. 23, 2015.
"Desmos", Desmos User Guide, http://s3.amazonaws.com/desmos/Desmos_Calculator User_Guide.pdf, Feb. 2, 2013, 1-10.
Page, "Quadratic curve and graph display (standard form)", Math Open Reference, Jan. 1, 2009.
"Fluid Math-2, Fluid Graphing Calculator for iPad", Sep. 20, 2012, https://www.youtube.com/watch?v=Nz8WP-NVXJc.
"Fluid Math-3, SmartBoard Math Software for Algebra Teachers", Feb. 25, 2012, https://www.youtube.com/watch?v=LRqOBK03g2E.
"FluidMath-1 Introduction—Tablet and Interactive Whiteboard Math Software", Mar. 2, 2011, https://www.youtube.com/watch?v=BAFGONn4KoQ.
"sketch2Graph iPad App (Tutorial)", Nov. 30, 2012, https://www.youtube.com/watch?v=0ss1MPU-TBE.
Graphing the Derivative as appearing on Nov. 15, 2013, available as http://web.archive.org/web/20131115154629/http://www.zweigmedia.com/RealWorld/calctopic1/derivgraph.html.
Hohenwarter, et al., "Introduction to Geogebra Version 4.4", International Geogebra Institute, 2013. Web. May 25, 2017.
Related U.S. Appl. No. 14/690,069; First Named Inventor: Kosuke Karoji; Title: "Graph Display Control Apparatus, Graph Display Control Method and Recording Medium Storing Graph Display Control Program"; filed Apr. 17, 2015.
Rgilesmath7, Vertex Form With FluidMath, Jan. 17, 2011, <https://www.youtube.com/watch?v=I7U7WwhM-U>.
Japanese Office Action dated Aug. 22, 2017 issued in counterpart Japanese Application No. 2014-057245.
Office Action (Final Rejection) dated Jan. 7, 2019 issued in U.S. Appl. No. 14/854,773.
Office Action (Non-Final Rejection) dated Feb. 25, 2019 issued in U.S. Appl. No. 14/690,069.

* cited by examiner

FIG. 10A  FIG. 10B  FIG. 10C
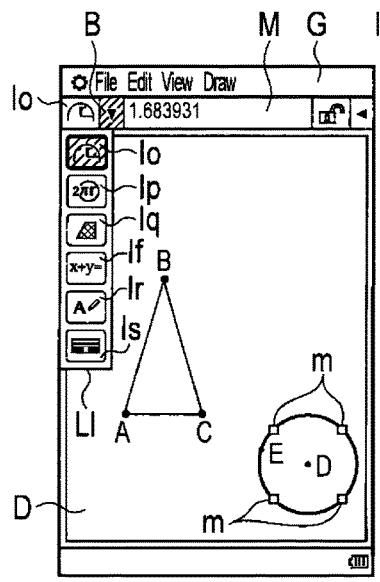
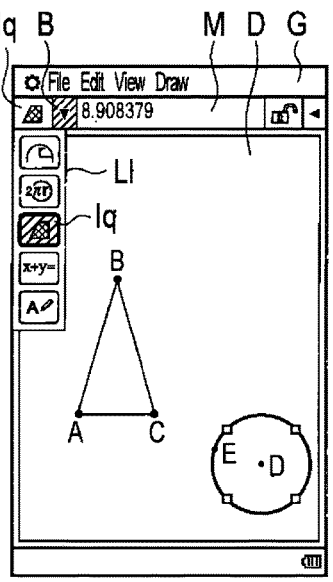
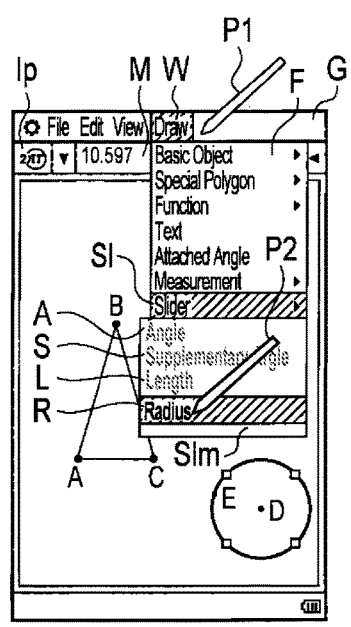
FIG. 10D  FIG. 10E  FIG. 10F
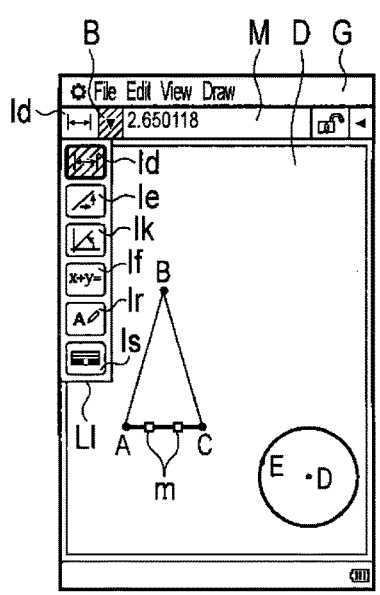
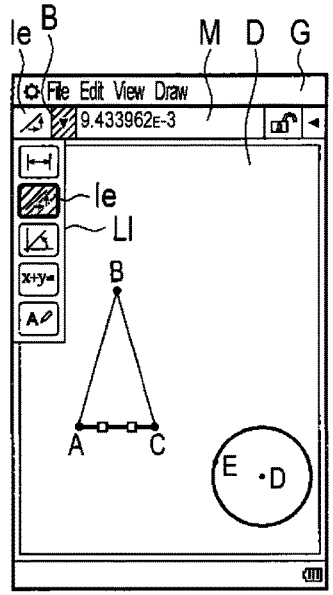
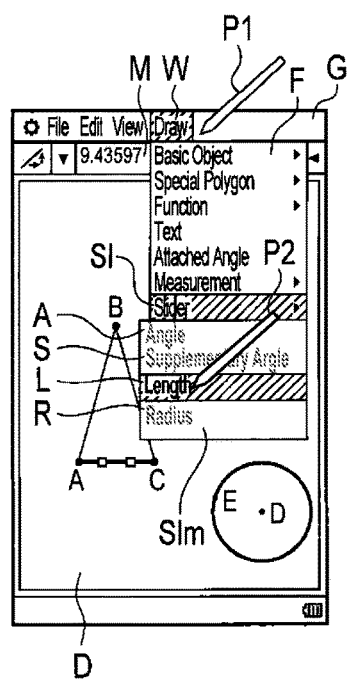

GRAPHIC DRAWING DEVICE AND RECORDING MEDIUM STORING GRAPHIC DRAWING PROGRAM

CROSS-REFERENCE TO RELATED APPLICATION

This application claims priority based on Japanese Patent Application No. 2014-057245, filed on Mar. 19, 2014, the entire contents of which are incorporated by reference herein.

BACKGROUND OF THE INVENTION

1. Field of the Invention

The present invention relates to graphic drawing devices and graphic drawing methods etc. each suitable for drawing arbitrary graphics.

2. Description of the Related Art

In a graphic display device of a related art, it has been considered to easily designate and select a part of a graphic displayed arbitrarily, then measure the length or size of a side or a corner as the selected part of the graphic, and display the measured value (see JP-A-2012-014440, for example).

SUMMARY OF THE INVENTION

Problems that the Invention is to Solve

The graphic display device of the relate art can designate a side or a corner as a part of a graphic, then measure the length of the designated side or the size of the designated corner and display the measured value.

However, this graphic display device can not change the graphic in a manner of sequentially changing the length of the designated side or the size of the designated corner with a simple operation.

The invention has been made in view of the aforesaid problem, and an object of the invention is to provide a graphic drawing device and control program thereof each of which can simply change a value of the part of a graphic designated by a user to thereby easily change and display the graphic.

Means for Solving the Problems

A graphic drawing device of the invention includes a display unit and a processor. The processor executes a process includes: displaying on the display unit, a measurement item corresponding to at least one graphic part drawn on the display unit; displaying on the display unit, a slider identifier for setting a slider in a case that the displayed measurement item is a type capable of setting a slider for changing a value of the displayed measurement item; and displaying on the display unit, a slider for changing the value of the displayed measurement item according to an operation by a user with respect to the displayed slider identifier.

BRIEF DESCRIPTION OF THE DRAWINGS

FIGS. 10A to 10F are diagrams showing a display operation (No. 3) according to a user operation based on the graphic display control processing of the graph function/graphic electronic calculator 10.

DETAILED DESCRIPTION OF THE INVENTION

Hereinafter, an embodiment according to the invention will be explained with reference to drawings.

Figure 1:
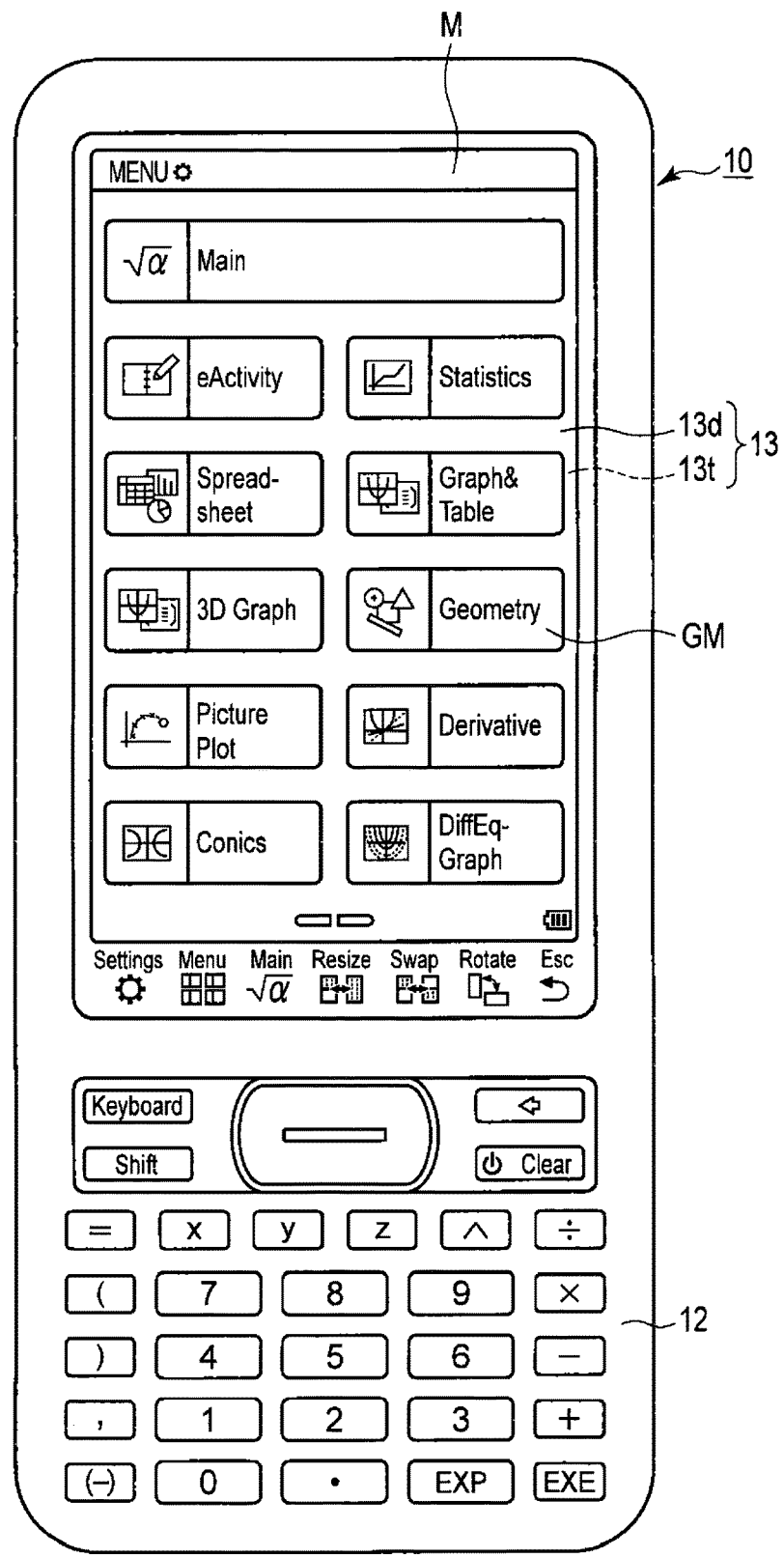
FIG. 1 is a front view showing the exterior configuration of a graph function/graphic electronic calculator 10 according to an embodiment of a graphic drawing device of the invention.

FIG. 1 is a front view showing the exterior configuration of the graph function/graphic electronic calculator 10 according to the embodiment of a graphic drawing device of the invention.

The graphic drawing device is implemented in the dedicated graph function/graphic electronic calculator 10 as explained below or configured as a tablet terminal, a mobile phone or a portable game machine, for example, each having a graphic displaying function.

Figure 2:
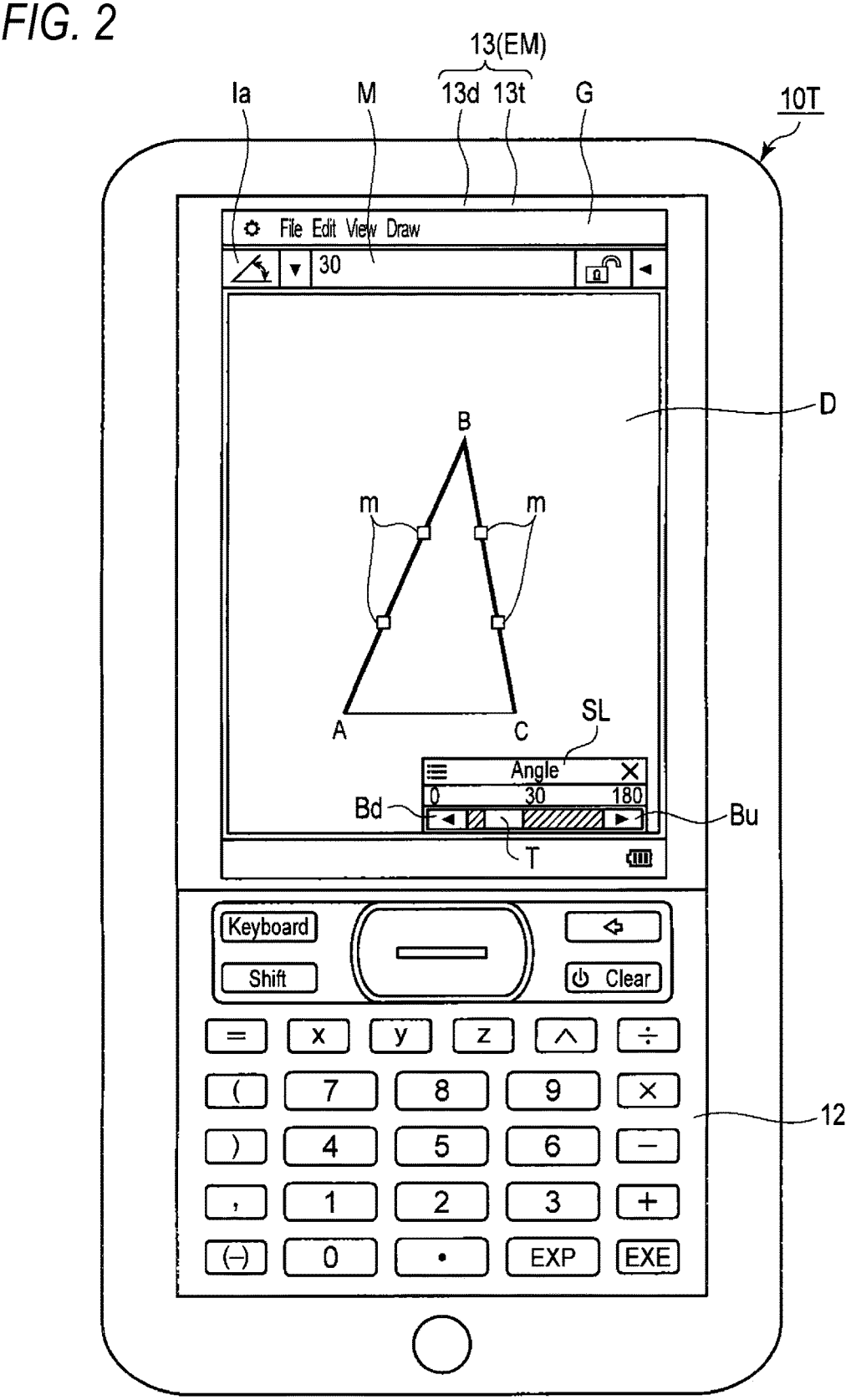
FIG. 2 is a front view showing the exterior configuration of a tablet terminal 10T mounting the emulator of the graph function/graphic electronic calculator 10, and showing the emulator screen EM of the graph function/graphic electronic calculator 10.

FIG. 2 is a front view showing the exterior configuration of a tablet terminal 10T mounting the emulator of the graph function/graphic electronic calculator 10, and showing the emulator screen EM of the graph function/graphic electronic calculator 10.

The graph function/graphic electronic calculator 10 has a function of displaying inputted function formulas and graph images respectively according to the inputted function formulas and a function of displaying inputted graphics.

The main body of the graph function/graphic electronic calculator 10 is provided with a key input part 12 at an almost lower half area of the front surface thereof and a touch panel display part 13 at an almost upper half area thereof.

The key input part 12 is provided with numerical value/symbol keys, function/operator keys and a cursor key etc.

The numeral/symbol keys are configured by a group of keys for inputting numerical values and symbols which constitute an arrangement of numeral keys and symbol keys.

The function/operator keys are configured by various kinds of function keys operated at the time of inputting a function formula, an operation formula and operator keys operated at the time of inputting operators such as [+], [−], [×], [÷] or [=].

The touch panel display part 13 is configured by overlapping a transparent touch panel 13*t* on a liquid crystal display screen 13*d* capable of performing color display.

The graph function/graphic electronic calculator 10 displays a main menu M as shown in FIG. 1 according to the touching operation of a menu button [Menu] displayed along the upper end of the touch panel display part 13. When one of various kinds of icons displayed on the main menu M is selectively touched, the electronic calculator is placed in an operation mode of a function according to the icon thus touched.

In this embodiment, the explanation will be made as to the operation mode (graphic mode) of the graphic displaying function activated by a [Geometry] icon GM.

As shown in FIG. 2, the graphic mode has, for example, a function of drawing an arbitrary graphic (triangle ABC in this case) in a graphic drawing area D which is opened by the drawing [Draw] function of a graphic screen G; a function of selecting graphic parts (side AB, side BC) of the graphic being drawn, adding a selection mark m to each of the selected graphic parts and discriminatively displaying each of the graphic parts by a thick line; a function of designating a numerical-value measurable item (measurement item: angle between the side AB and the side BC in this case) by a measurement item icon (angle icon Ia) based on the selected graphic parts (side AB, side BC) and displaying a measured value (30°) of the measurement item in a measurement box M; a function of displaying a slider (operational display element) SL [Angle] for changing the numerical value of the measurement item according to the operation of a user; and a function of changing the numerical value of the measurement item according to the operation of the knob T or the increment/decrement buttons Bu, Bd of the slider SL [Angle] to thereby display the graphic in a manner of changing the display size thereof according to the operation.

Figure 3:
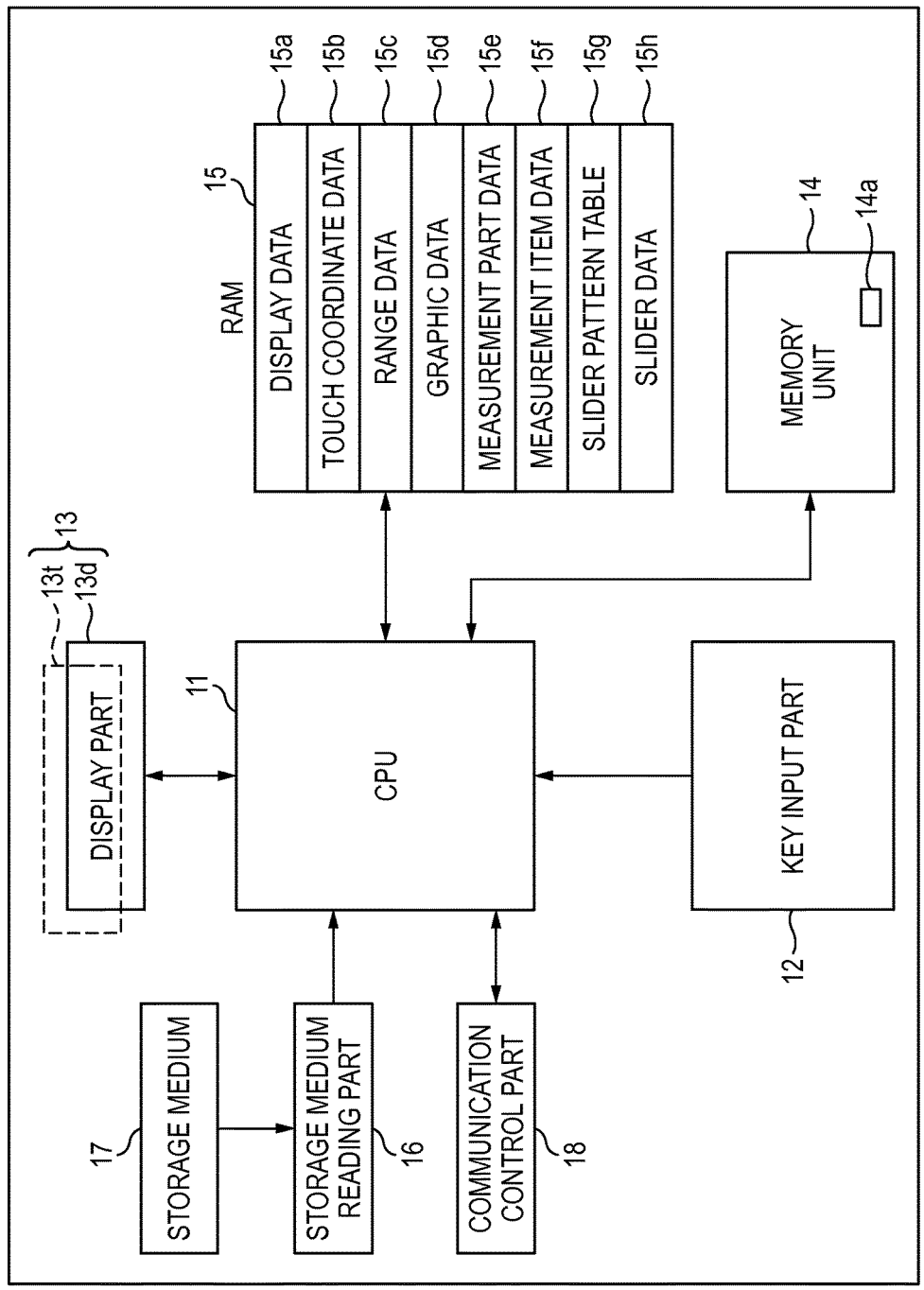
FIG. 3 is a block diagram showing the circuit configuration of the graph function/graphic electronic calculator 10.

FIG. 3 is a block diagram showing the circuit configuration of the graph function/graphic electronic calculator 10.

The graph function/graphic electronic calculator 10 includes a CPU 11 as a microcomputer.

According to electronic calculator control program 14*a* stored in advance in a memory unit 14 such as a flash ROM, or the electronic calculator control program 14*a* read into the memory unit 14 via a storage medium reading part 16 from an external storage medium 17 such as a memory card, or the electronic calculator control program 14*a* downloaded into the memory unit 14 via a communication control part 18 from a Web server (program server) on a communication network (internet), the CPU 11 controls the operations of the respective portions of the circuit using a RAM 15 as a work memory to thereby execute various kinds of the functions of the graph function/graphic electronic calculator 10 such as an electronic calculator function, a function graph drawing function and a graphic drawing function.

The memory unit 14, the RAM 15, the storage medium reading part 16 and the communication control part 18 etc. as well as the key input part 12 and the touch panel display part 13 shown in FIG. 1 (FIG. 2) are connected to the CPU 11.

The RAM 15 stores various kinds of data necessary for the processing operation of the CPU 11. The RAM 15 includes not only a display data memory area 15*a* in which data to be displayed in colors on the screen of the touch panel display part 13 is developed but also a touch coordinate data memory area 15*b*, a range data memory area 15*c*, a graphic data memory area 15*d*, a measurement part data memory area 15*e*, a measurement item data memory area 15*f*, a slider pattern table 15*g* and a slider data memory area 15*h*, etc.

The touch coordinate data memory area 15*b* stores the coordinate data of a touch position according to a user operation which is detected by the touch panel display part 13.

The range data memory area 15*c* stores an X-coordinate range (Xmin to Xmax) and a Y-coordinate range (Ymin to Ymax) representing the display range of a graph set with respect to the graph drawing area of the touch panel display part 13 in the graph mode.

The graphic data memory area 15*d* stores graphic data drawn in the graphic drawing area D as combinations of parts constituting this graphic.

The measurement part data memory area 15*e* stores data relating to a part or parts (graphic part or graphic parts) to be measured which is (are) selected according to a user operation with respect to a graphic displayed in the graphic drawing area D.

The measurement item data memory area 15*f* stores the numerical-value measurable items (measurement item: length, angle, supplementary angle, inclination, inclination angle, distance, radius, circumference, area, formula etc.) according to the part or parts (graphic part or graphic parts) of the graphic to be measured stored in the measurement part data memory area 15*e*.

The slider pattern table 15*g* stores, as to each of the measurement items stored in the measurement item data memory area 15*f*, data relating to the pattern of the slider SL as the operational display element for changing the numerical value thereof according to a user operation, together with data relating to the shape and color thereof, the number of variable steps of the knob T and the number of variable steps of the increment/decrement buttons Bu, Bd.

The slider data memory area 15*h* stores the variable minimum value (Min), the variable maximum value (Max) and a current value (Current) relating to the numerical value of the measurement item of the slider SL displayed based on the slider pattern, a unit change value (Dot) of the knob T and a unit change value (Step) of the increment/decrement buttons Bu, Bd.

The unit change value (Step) of the increment/decrement buttons Bu, Bd represents a decrement or increment numerical change value according to a single touch (click) operation with respect to the increment button "→" Bu or the decrement button "←" Bd. Separately from this change value, the unit change value (Dot) of the knob T represents a numerical change value corresponding to the movement width of one display dot in the variable range (minimum value (Min) to maximum value (Max)) of the knob T.

In this respect, the unit change value (Step) according to the single touch (click) operation with respect to the increment button "→" Bu or the decrement button "←" Bd of the slider SL is defined as a step unit, whilst the unit change value (Dot) corresponding to the movement width of the one display dot in the variable range of the knob T of the slider SL is defined as a dot unit.

In the graph function/graphic electronic calculator 10 configured in this manner, the CPU 11 controls the operations of the respective portions of the circuit according to the instructions of various processing described in the electronic calculator control program 14*a*, thereby realizing various kinds of functions described in the following explanation of the operations by the cooperation of the software and the hardware.

Next, the operation of the graph function/graphic electronic calculator 10 configured in the aforesaid manner will be explained.

Figure 4:
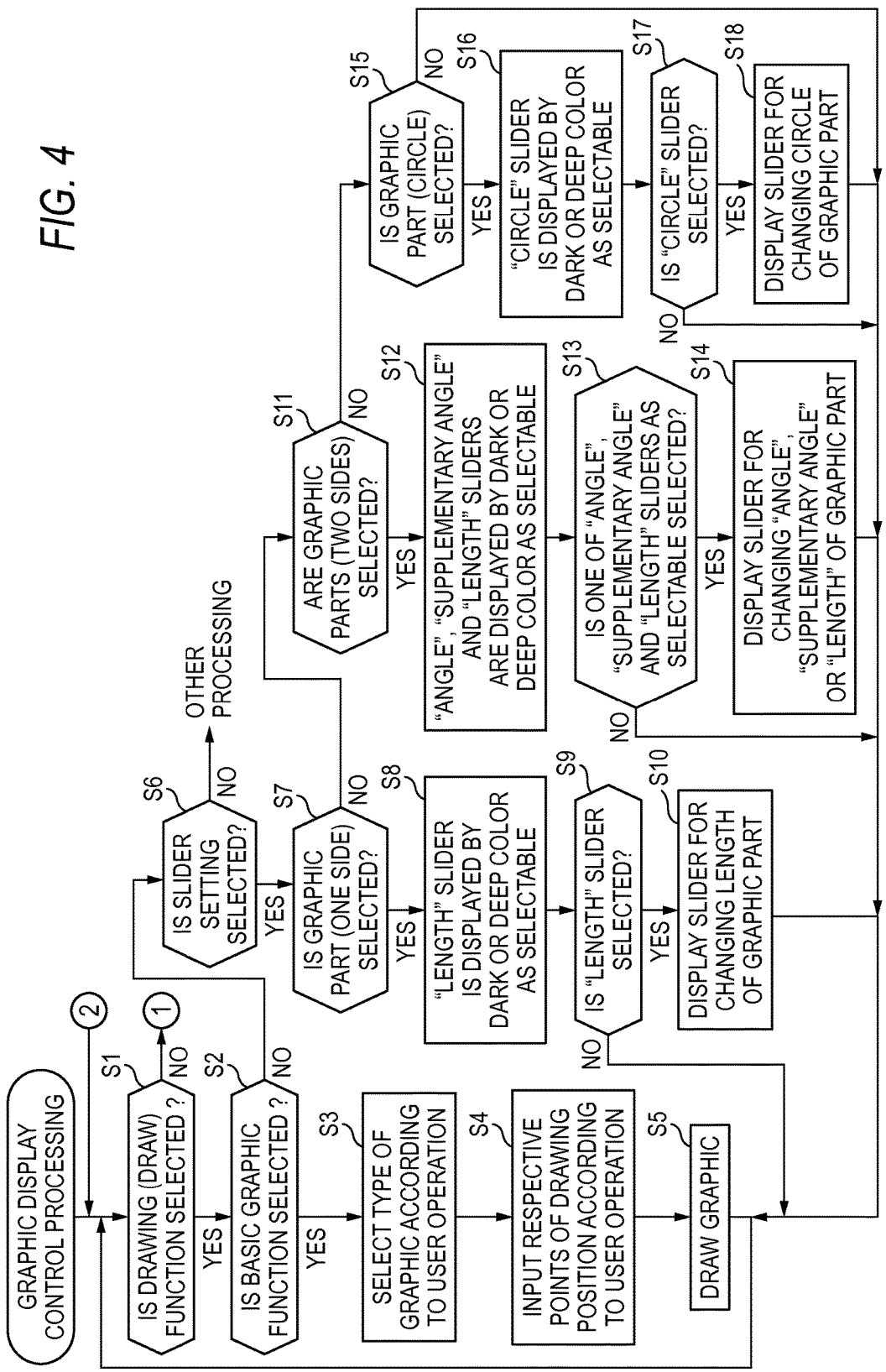
FIG. 4 is a flowchart showing a graphic display control processing (No. 1) to be executed by the graphic mode of the graph function/graphic electronic calculator 10.

FIG. 4 is a flowchart showing a graphic display control processing (No. 1) to be executed by the graphic mode of the graph function/graphic electronic calculator 10.

Figure 5:
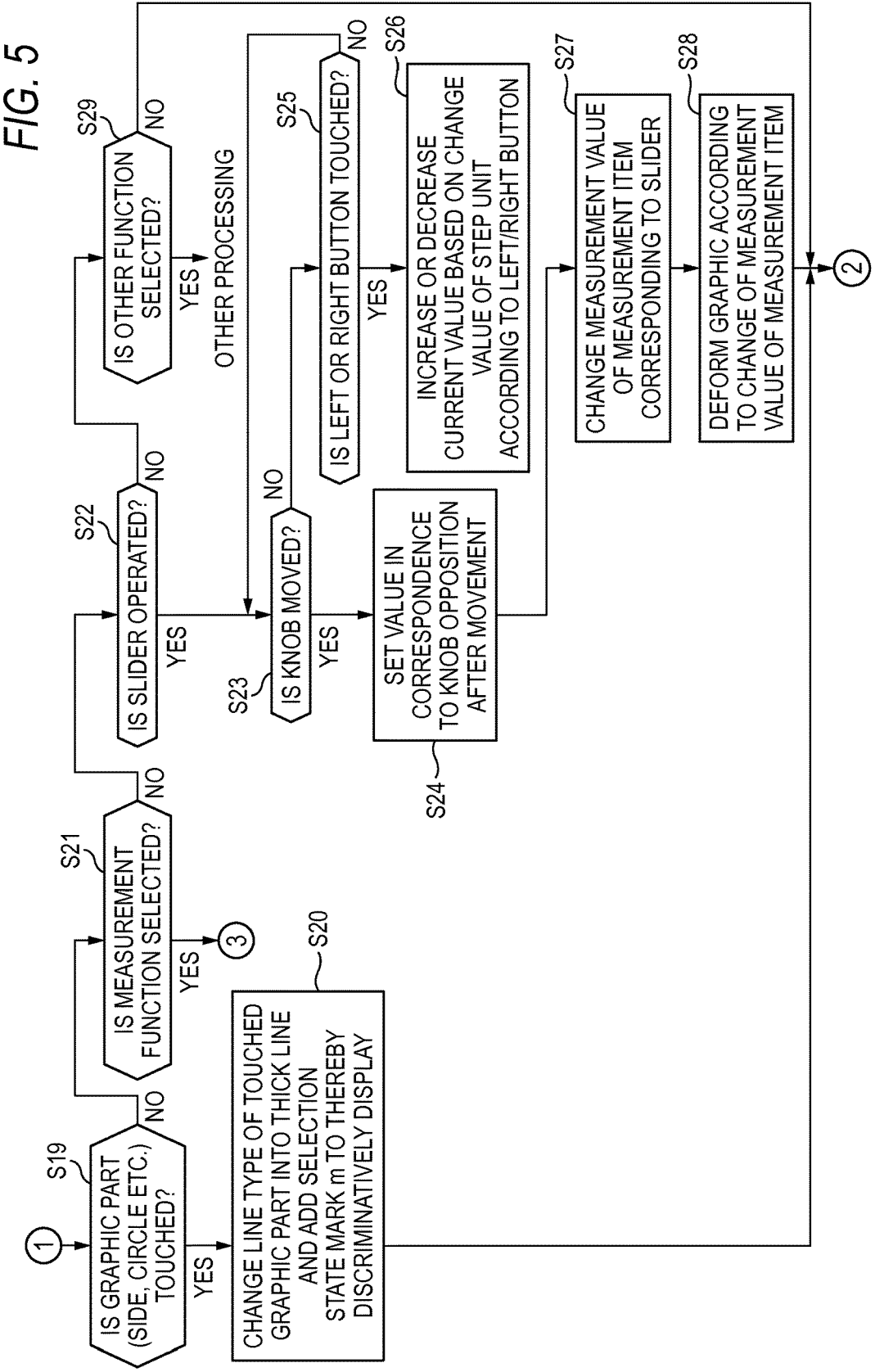
FIG. 5 is a flowchart showing a graphic display control processing (No. 2) to be executed by the graphic mode of the graph function/graphic electronic calculator 10.

FIG. 5 is a flowchart showing a graphic display control processing (No. 2) to be executed by the graphic mode of the graph function/graphic electronic calculator 10.

Figure 6:
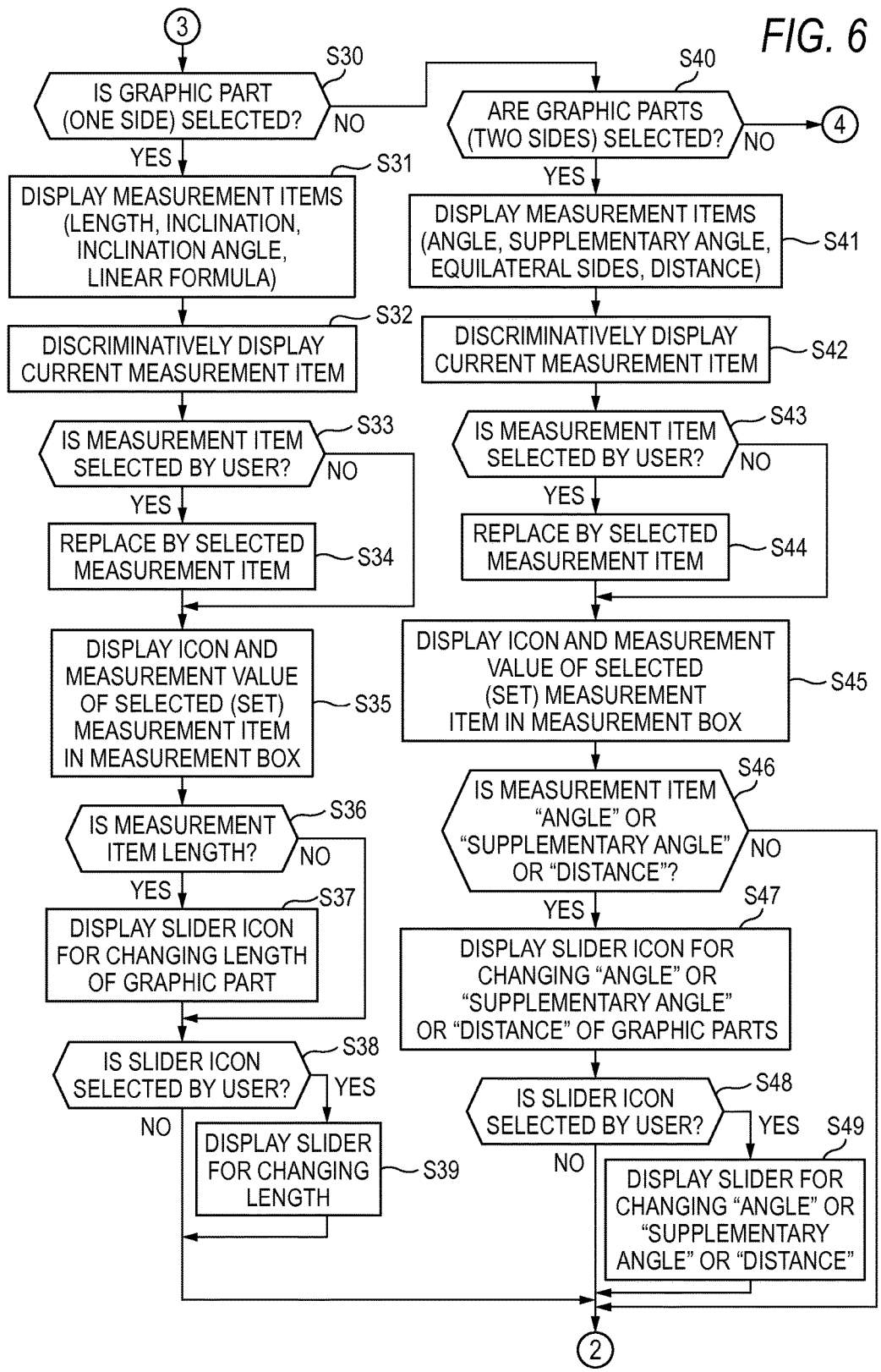
FIG. 6 is a flowchart showing a graphic display control processing (No. 3) to be executed by the graphic mode of the graph function/graphic electronic calculator 10.

FIG. 6 is a flowchart showing a graphic display control processing (No. 3) to be executed by the graphic mode of the graph function/graphic electronic calculator 10.

Figure 7:
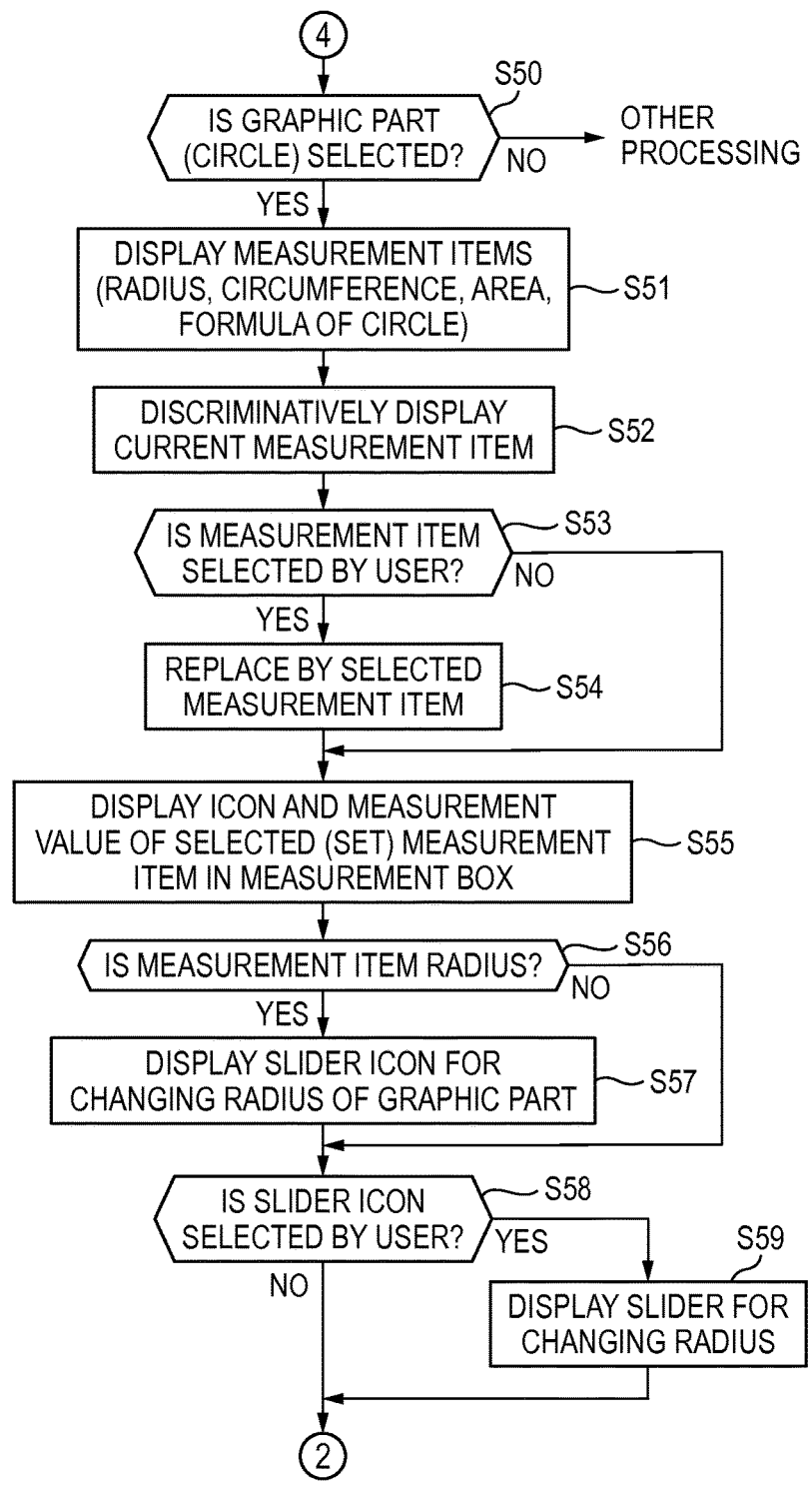
FIG. 7 is a flowchart showing a graphic display control processing (No. 4) to be executed by the graphic mode of the graph function/graphic electronic calculator 10.

FIG. 7 is a flowchart showing a graphic display control processing (No. 4) to be executed by the graphic mode of the graph function/graphic electronic calculator 10.

FIGS. 8A to 8F are diagrams showing a display operation (No. 1) according to a user operation based on the graphic display control processing of the graph function/graphic electronic calculator 10.

FIGS. 9A to 9F are diagrams showing a display operation (No. 2) according to a user operation based on the graphic display control processing of the graph function/graphic electronic calculator 10.

FIGS. 10A to 10F are diagrams showing a display operation (No. 3) according to a user operation based on the graphic display control processing of the graph function/graphic electronic calculator 10.

As shown in FIG. 1, when the [Geometry] icon GM is touched in the main menu M displayed on the touch panel display part 13 to thereby set the graphic mode, the graphic display control processing in FIGS. 4 to 7 is started.

Figure 8A:
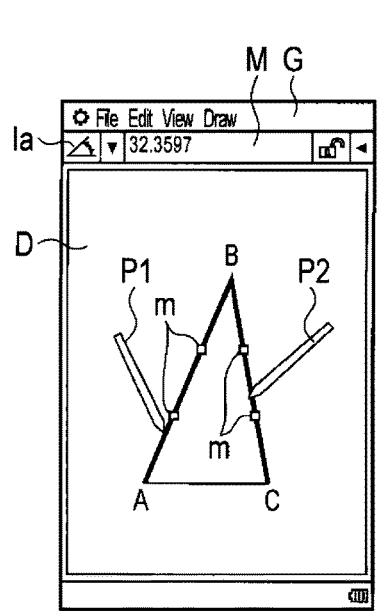
FIGS. 8A to 8F are diagrams showing a display operation (No. 1) according to a user operation based on the graphic display control processing of the graph function/graphic electronic calculator 10.

In the graphic screen G of the touch panel display part 13 after starting the graphic display control processing, according to a user operation, when the drawing [Draw] function is selected (step S1 (Yes)), a basic graphic (Basic Object) function is selected (step S2 (Yes)) and the type of graphic is selected (step S3), the graphic drawing area D capable of drawing a graphic of the selected type (triangle in this case) is displayed as shown in FIG. 8A.

When vertexes A, B, C corresponding to the triangle arbitrarily selected by a user are inputted in the graphic drawing area D according to the touching operation of a pen (step S4), the triangle (ABC) corresponding to the respective vertexes thus inputted is drawn and displayed (step S5).

With respect to this triangle (ABC), when the side (AB) and the side (BC) as the graphic parts are respectively touched and selected by the pens P1, P2 in order to measure the angle (interior angle) of the vertex B (step S9 (Yes)), the line type of each of the side (AB) and the side (BC) thus selected is changed into a thick line. Further, a selection state mark m is added to each of the sides (AB) and (BC) to thereby discriminatively display these sides (step S20).

At this time, in the measurement box M at the upper part of the graphic screen G, an angular icon Ia for setting the measurement item of the selected parts to an angle is displayed as default, and also an angle formed by the selected sides (AB) and (BC) is measured as "32.3597" and displayed.

Figure 8B:
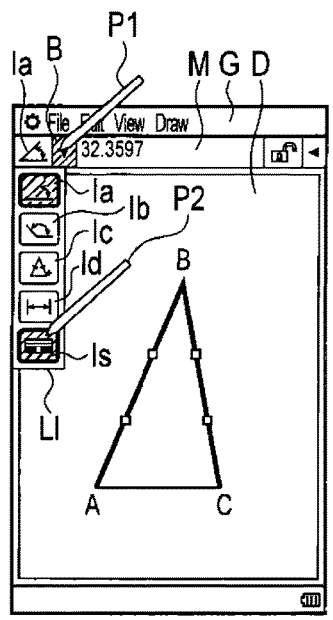

As shown in FIG. 8B, when the measurement function button B of the measurement box M is selected by the touching operation of the pen P1 (step S21 (Yes)), it is determined that the graphic parts in the selection state are the two sides (AB), (BC) (step S40 (Yes)). Then, a measurement item list LI, in which items (angle, supplementary angle, equilateral sides?, distance) measurable from the graphic parts of the two sides are respectively represented by icons (angle Ia, supplementary angle Ib, equilateral sides? Ic, distance Id), is displayed (step S41).

In the measurement item list LI, the icon (angle icon Ia in this case) corresponding to the measurement item now being set is reversely displayed discriminatively (step S42).

Figure 8C:
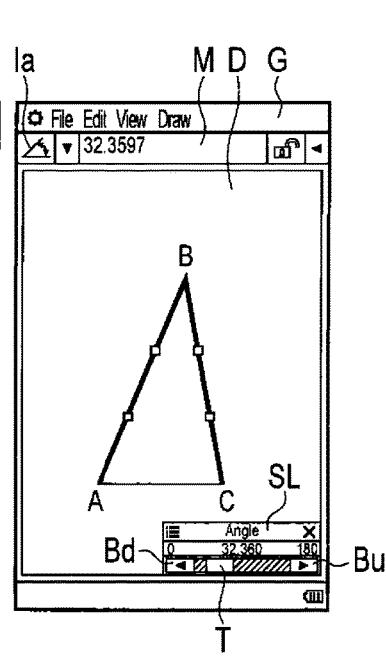
Figure 8D:
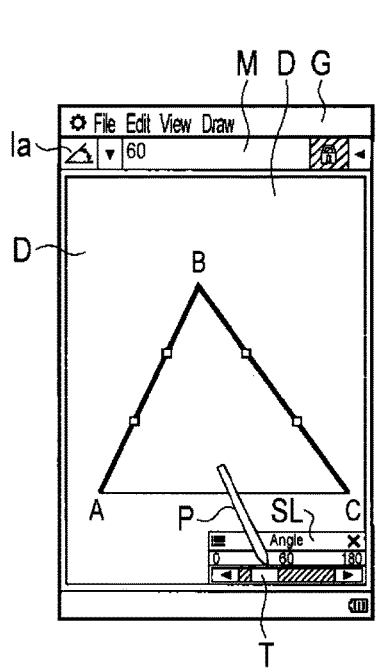
Figure 8E:
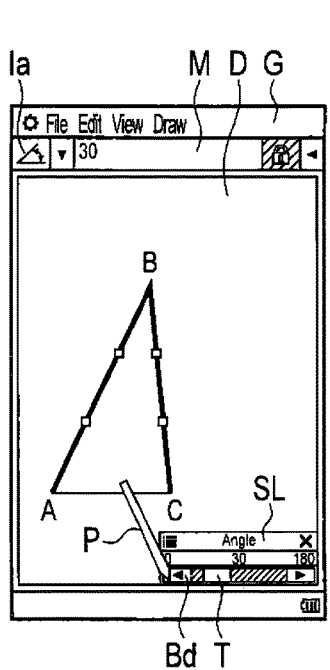
Figure 8F:
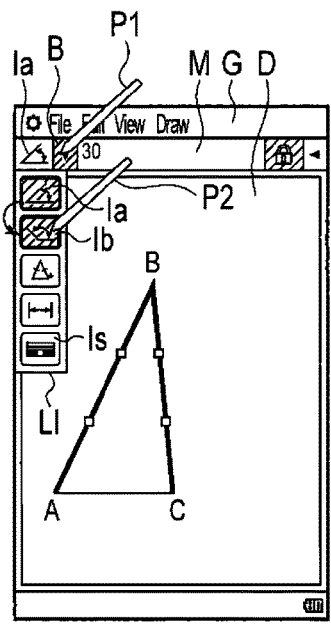
Figure 9A:
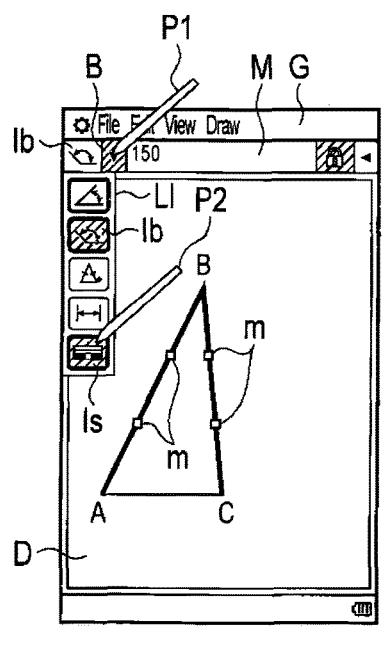
FIGS. 9A to 9F are diagrams showing a display operation (No. 2) according to a user operation based on the graphic display control processing of the graph function/graphic electronic calculator 10.

For example, as shown in FIG. 8F, when one of the measurement items (icon Ib of supplementary angle in this case) is selected by the touching operation of the pen from the measurement item list LI (step S43 (Yes)), the measurement item (angle Ia) now being set is replaced by the selected measurement item (supplementary angle Ib) (step S44). Thus, as shown in FIG. 9A, the icon Ib of the supplementary angle of the replacement measurement item and the measurement value "150" thereof are displayed in the measurement box M (step S45).

Then, determination is made as to whether the measurement item now being set is "angle", "supplementary angle" or "distance". That is, determination is made as to whether the measurement item now being set is a measurement item capable of changing the numerical value thereof with respect to the selected graphic parts (two sides (AB), (BC)) (step S46).

As shown in FIG. 8B or FIG. 8F, when the determination is made that the measurement item now being set is "angle", "supplementary angle" or "distance" and is a measurement item capable of changing the numerical value thereof with respect to the selected graphic parts (two sides (AB), (BC)) (step S46 (Yes)), a slider icon Is is added to the measurement item list LI and displayed (step S47). This slider icon Is represents that the slider SL for simply changing the numerical value of this measurement item can be used.

Then, as shown in FIG. 8B, in the state that the measurement item is set to the angle (Ia), when the slider icon Is is selected by the touching operation of the pen P2 (step S48 (Yes)), a slider SL [Angle] for changing the angle is displayed in a vacant area (bottom right area as default) of the graphic drawing area D based on respective data of the slider pattern table 15g and the slider data memory area 15h, as shown in FIG. 8C (step S49).

Then, as shown in FIG. 8D, when the knob T of the slider SL [Angle] is touched and moved by the pen P (steps S22, S23 (Yes)), a numerical value "60" is set in correspondence to the position of the knob T after the movement based on the change value (Dot) of a dot unit according to the movement of the knob T (step S24). Thus, the numerical value of the measurement item (angle) displayed in the measurement box M is changed to the numerical value "60" thus set (step S27).

According to the numerical change of the measurement item (angle) to "60" from "30", the angle formed by the graphic parts (side (AB) and side (BC)) in the selection state is changed and hence the triangle (ABC) is deformed and displayed (step S28).

Further, when the decrement button Bd of the slider SL [SuppAngl] is touched by the pen P (steps S22, S25 (Yes)), a reduced numerical value "30" is set based on the change value (Step) of a step unit according to the touching operation of the decrement button Bd (step S26) as shown in FIG. 8E. Thus, the numerical value of the measurement item (supplementary angle) displayed in the measurement box M is changed to the numerical value "30" thus set (step S27).

Thus, like the aforesaid case of operating the knob T, according to the numerical change of the measurement item (angle) to "30" from "60", the angle formed by the graphic parts (side (AB) and side (BC)) in the selection state is changed and hence the triangle (ABC) is deformed and displayed (step S28).

Figure 9B:
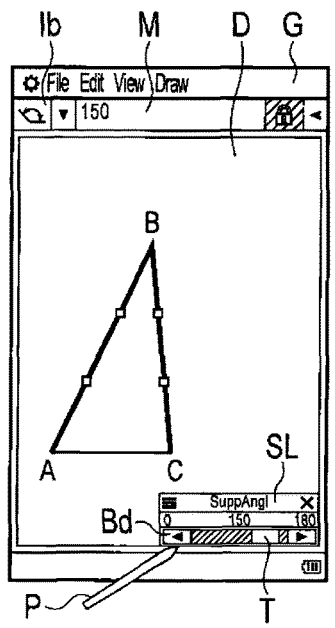

Also, as shown in FIG. 9A, when the measurement item is set to the supplementary angle (Ib) and the slider icon Is is touched and selected by the pen P2 in a state of displaying the supplementary angle icon Ib and the measurement value "150" thereof (step S48 (Yes)), a slider SL [SuppAngl] (abbreviation of supplementary angle) for changing the supplementary angle is displayed as shown in FIG. 9B.

Figure 9C:
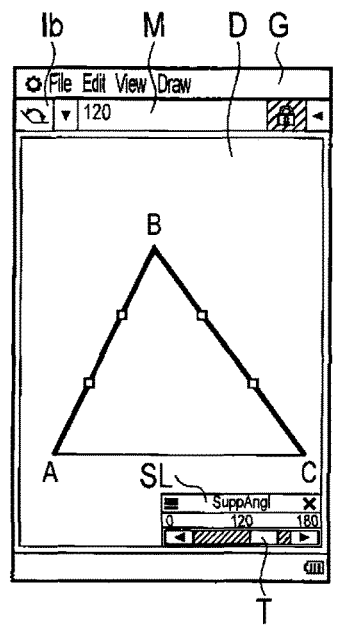

In this state, when the decrement button Bd of the slider SL [SuppAngl] is touched by the pen P (steps S22, S25 (Yes)), a reduced numerical value "120" is set based on the change value (Step) of a step unit according to the touching operation of the decrement button Bd (step S26) as shown in FIG. 9C. Then, the numerical value of the measurement item (supplementary angle) displayed in the measurement box M is changed to the numerical value "120" thus set (step S27).

Thus, like the aforesaid case, according to the numerical change of the measurement item (supplementary angle) to "120" from "150", the angle formed by the graphic parts (side (AB) and side (BC)) in the selection state is changed and hence the triangle (ABC) is deformed and displayed (step S28).

Figure 9D:
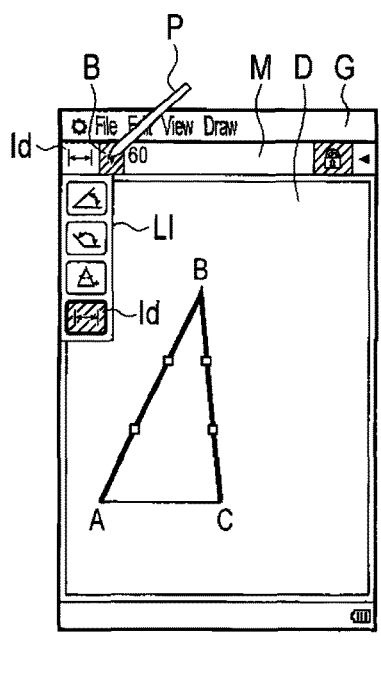

On the other hand, as shown in FIG. 9D, despite of a case that the two sides (AB), (BC) are selected as the graphic parts of the triangle (ABC) and the measurement item now being set selected from the measurement item list LI is the distance (Id), when the selected two sides (AB), (BC) are not parallel lines and hence the distance therebetween is "0", the determination is made that the measurement item now being set is not a measurement item capable of changing the numerical value thereof with respect to the selected graphic parts (step S46 (No)). As a result, the slider icon Is is not added to the measurement item list LI.

As shown in FIG. 10D, in a state that the triangle (ABC) is drawn and displayed in the graphic drawing area D (steps S1 to S5) and the side (AC) is selected as the graphic part and discriminatively displayed (step S19 (Yes), step S20), when the measurement function button B of the measurement box M is selectively touched (step S21 (Yes)), the determination is made that the graphic part in the selection state is the side (AC) (step S30 (Yes)). Then, the measurement item list LI, in which items (length, inclination, inclination angle, linear formula) measurable from this graphic part of the one side are respectively represented by icons (length Id, inclination Ie, inclination angle Ik, linear formula If), is displayed (step S31).

In the measurement item list LI, the icon (length icon Id in this case) corresponding to the measurement item now being set is reversely displayed discriminatively (step S32).

When the determination is made that the measurement item now being set is the length, that is, the measurement item now being set is a measurement item capable of changing the numerical value thereof with respect to the selected graphic part (one side (AC)) (step S36 (Yes)), the slider icon Is is added to the measurement item list LI and displayed (step S37). This slider icon Is represents that the slider SL for simply changing the numerical value of this measurement item can be used.

In the state that the measurement item is set to the length (Id), when the slider icon Is is selected by the touching operation of the pen (step S38 (Yes)), a slider SL (not shown) for changing the length is displayed in a vacant area of the graphic drawing area D (step S39).

Then, as shown in FIG. 10E, when the measurement item of the inclination (inclination icon Ie) is selected from the measurement item list LI (step S33 (Yes)), the measurement item (length Id) now being set is replaced by the selected measurement item (inclination Ie) (step S34). Thus, the inclination icon Ie of the replacement measurement item and the measurement value "9.433 - - - " thereof are displayed in the measurement box M (step S35).

In this case, the determination is made that the measurement item now being set which is selected from the measurement item list LI is not the length (Id) but the inclination (Ie) and hence the measurement item now being set is not a measurement item capable of changing the numerical value thereof with respect to the graphic part (one side (AC)) (step S36 (No)). As a result, the slider icon Is is not added to the measurement item list LI.

As shown in FIG. 10A, in a state that a circle is drawn and displayed in the graphic drawing area D (steps S1 to S5) and the circle is selected as the graphic part and discriminatively displayed (step S19 (Yes), step S20), when the measurement function button B of the measurement box M is selectively touched (step S21 (Yes)), the determination is made that the graphic part in the selection state is the circle (step S50 (Yes)). Then, the measurement item list LI, in which items (radius, circumference, area, formula of circle) measurable from this graphic part are respectively represented by icons (radius Io, circumference Ip, area Iq, formula of circle If), is displayed (step S51).

In the measurement item list LI, the icon (radius icon Io in this case) corresponding to the measurement item now being set is reversely displayed discriminatively (step S52).

When the determination is made that the measurement item now being set is the radius, that is, the measurement item now being set is a measurement item capable of changing the numerical value thereof with respect to the selected graphic part (circle) (step S56 (Yes)), the slider icon Is is added to the measurement item list LI and displayed (step S57). This slider icon Is represents that the slider SL for simply changing the numerical value of this measurement item can be used.

In the state that the measurement item is set to the radius (Io), when the slider icon Is is selected by the touching operation of the pen (step S58 (Yes)), a slider SL (not shown) for changing the radius is displayed in a vacant area of the graphic drawing area D (step S59).

Then as shown in FIG. 10B, when the measurement item of the area (area icon Iq) is selected from the measurement item list LI (step S53 (Yes)), the measurement item (radius Io) now being set is replaced by the selected measurement item (area Iq) (step S54). Thus, the area icon Iq of the replacement measurement item and the measurement value "8.908 - - - " thereof are displayed in the measurement box M (step S55).

In this case, the determination is made that the measurement item now being set which is selected from the measurement item list LI is not the radius (Io) but the area (Iq) and hence the measurement item now being set is not a measurement item capable of changing the numerical value thereof with respect to the graphic part (circle) (step S56 (No)). As a result, the slider icon Is is not added to the measurement item list LI.

In this manner, according to the graphic display control function of the graph function/graphic electronic calculator 10, when a user selects the graphic part or parts as a measurement subject with respect to an arbitrary graphic which is drawn and displayed in the graphic drawing area D, the list of icons (measurement item list LI) representing the measurable items according to the selected graphic part or parts is displayed. Then, when the icon of the measurement item capable of changing the numerical value thereof with respect to the graphic part or parts being selected is selected from the measurement item list LI, the slider icon Is is added to the measurement item list LI and displayed. In this respect, this slider icon Is represents that the slider SL for simply changing the numerical value of this measurement item can be used. When this slider icon Is is selected, the corresponding slider SL is displayed in the vacant area of the graphic drawing area D.

Accordingly, the numerical value of the graphic part or parts designated by a user can be simply changed by operating the slider SL and then the graphic can be easily changed and displayed according to the operation.

Figure 9E:
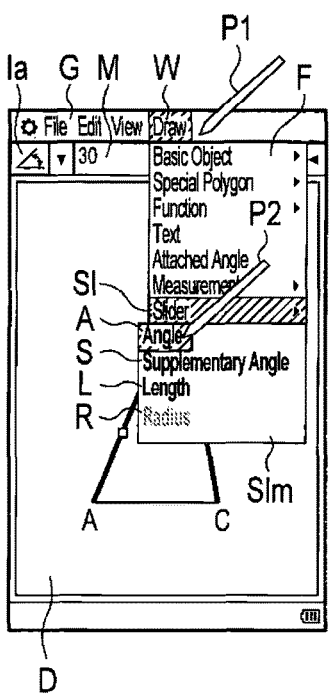

As shown in FIG. 9E, in a state that the two sides (AB), (BC) of the triangle (ABC) displayed in the graphic drawing area D are selected as the graphic parts to be measured, when a user selects a drawing [Draw] function W by the touching operation of the pen P1, a drawing function list F is displayed as a pull-down menu (step S1 (Yes)). Then, the setting item [Slider] S1 of the slider is selected (step S6 (Yes)).

Then, the determination is made that the graphic parts in the selection state are the two sides (AB), (BC) (step S11 (Yes)). Thus, in a slider selection menu S1m displayed as a pull-down menu from the setting item [Slider] S1 of the slider, each of angle [Angle] A, supplementary angle [Supplementary Angle] S and length [Length] L, that are measurement items capable of changing the numerical values thereof with respect to the graphic parts (two sides (AB), (BC)), is displayed by characters of dark or deep color representing as selectable. Further, radius [Radius] R, which is a measurement item not capable of changing the numerical value thereof with respect to the graphic parts, is displayed by characters of light or pale color representing as non-selectable (step S12)

Figure 9F:
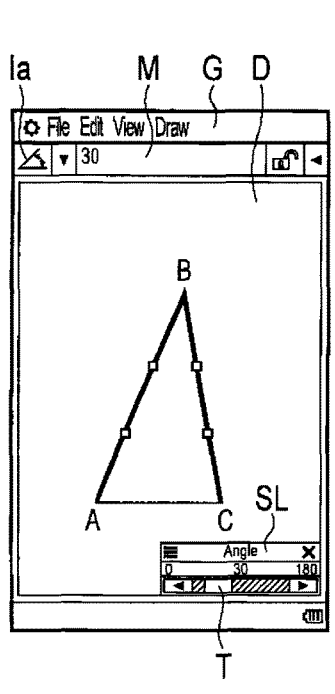

Then, in the slider selection menu S1m, when the angle [Angle] A as the measurement item capable of changing the numerical value thereof is selected by the touching operation of the pen P2 (step S13 (Yes)), the slider SL [Angle] for changing this angle is displayed in a vacant area of the graphic drawing area D (step S14) as shown in FIG. 9F.

As shown in FIG. 10C, in a state that a circle displayed in the graphic drawing area D is selected as the graphic part to be measured, a user selects the setting item [Slider] S1 of the slider in the drawing function list F which is displayed as the pull-down menu according to the touching operation of the pen P1 by a user (steps S1, S6, S15 (Yes). Thus, the slider selection menu S1m is displayed as the pull-down menu. In this slider selection menu S1m, only the radius [Radius] R, which is a measurement item capable of changing the numerical value thereof with respect to the graphic part (circle), is displayed by characters of dark or deep color representing as selectable (step S16).

Then, in the slider selection menu S1m, when the radius [Radius] R as the measurement item capable of changing the numerical value thereof is selected by the touching operation of the pen P2 (step S17 (Yes)), a slider SL (not shown) for changing this radius is displayed in a vacant area of the graphic drawing area D (step S18).

As shown in FIG. 10F, like the aforesaid case, in a state that the side (AC) of the triangle (ABC) displayed in the graphic drawing area D is selected as the graphic part to be measured, a user selects the setting item [Slider] S1 of the slider in the drawing function list F which is displayed as the pull-down menu according to the touching operation of the pen P1 by a user (steps S1, S6, S7 (Yes)). Thus, the slider selection menu S1m is displayed as the pull-down menu. In this slider selection menu S1m, only the length [Length] L, which is a measurement item capable of changing the numerical value thereof with respect to the graphic part (side (AC)), is displayed by characters of dark or deep color representing as selectable (step S8).

Then, in the slider selection menu S1m, when the length [Length] L as the measurement item capable of changing the numerical value thereof is selected by the touching operation of the pen P2 (step S9 (Yes)), a slider SL (not shown) for changing this length is displayed in a vacant area of the graphic drawing area D (step S10).

In this manner, according to the graphic display control function of the graph function/graphic electronic calculator 10, a user selects the graphic part or parts as a measurement subject with respect to an arbitrary graphic which is drawn and displayed in the graphic drawing area D. Then, the slider selection menu S1m is displayed as the pull-down menu from the setting item [Slider] S1 of the slider in the drawing function list F. Thus, in the slider selection menu S1m, the measurement item capable of changing the numerical value thereof with respect to the selected graphic part or parts is displayed by characters of dark or deep color representing as selectable, whilst the measurement item not capable of changing the numerical value thereof with respect to the selected graphic part or parts is displayed by characters of light or pale color representing as non-selectable.

Thus, with respect to the graphic part or parts to be measured selected by a user, a user can know at a glance whether or not there is a measurement item which numerical value can be easily changed according to the operation of the slider SL to thereby change the graphic, and also can know at a glance such the measurement item. Further, the corresponding slider SL can be immediately displayed by selecting this measurement item.

Accordingly, the numerical value of the graphic part or parts designated by a user can be more simply changed by operating the slider SL and then the graphic can be easily changed and displayed according to the operation.

Each of the methods and databases of the respective processing according to the graphic drawing device described in the aforesaid embodiment, that is, each of the methods of the respective processing such as the graphic display control processing (No. 1 to No. 4) shown in the flowcharts of FIGS. 4 to 7 and the databases such as the slider pattern table 15g and the slider data 15h shown in FIG. 3 can be stored, as a program executable by a computer, into a medium for an external storage device such as a memory card (ROM card, RAM card etc.), a magnetic disc (floppy disc, hard disc etc.), an optical disc (CD-ROM, DVD etc.) or a semiconductor memory, and then distributed. The computer (control device) of an electronic device provided with a display unit capable of inputting data by a user is controlled in its operations by the program which is read from the medium of the external storage device and written into the memory unit of the computer. Thus, the aforesaid graphic drawing functions explained in the embodiment can be realized and the processing similar to the aforesaid methods can be executed.

The program data for realizing the aforesaid respective methods can be transmitted on a communication network in the form of program codes. Then, the program data may be fetched and stored, from a computer (program server) connected to the communication network, into the memory unit of the electronic device provided with the display unit capable of inputting data by a user to thereby also realize the aforesaid graphic drawing functions.

Further, since the embodiment contains inventions at various stages, various kinds of inventions can be extracted by suitably combining the constituent elements disclosed therein. For example, even in a case where at least one constituent element is deleted from the entirety of the constituent elements in the embodiment or some of the constituent elements of the embodiment are suitably combined so as to form a different mode, if the problem described in the "Problems that the Invention is to Solve" is solved and the effects described in the "Effects of the Invention" is attained, this configuration obtained by the deletion of the at least one constituent element or the combination of the constituent elements can be extracted as the invention.

What is claimed is:

1. A graphic drawing device comprising:
a display unit;
a memory which includes a slider pattern table and a slider data memory area in which slider data is stored; and
a processor which executes processes including:
 displaying at least one graphic part drawn on the display unit;
 displaying, on the display unit, a measurement item which represents a type of an action of measuring the at least one graphic part drawn on the display unit;
 displaying, on the display unit, a slider identifier for setting to display a slider on the display unit according to an operation by a user after displaying the at least one graphic part drawn on the display unit, in a case that the displayed measurement item is a type capable of setting to display the slider on the display unit, the slider being a slider for changing a value of the displayed measurement item;
 displaying, on the display unit, a slider for changing the value of the displayed measurement item according to an operation by the user with respect to the displayed slider identifier; and
 changing the value of the displayed measurement item according to an operation by the user with respect to the displayed slider to thereby change the drawn graphic;
wherein the process of displaying the slider identifier includes:
 determining whether or not two sides of the drawn graphic are parallel lines when the displayed measurement item is a measurement item of a distance between the two sides;
 displaying the slider identifier on the display unit when the determining determines that the two sides are parallel; and
 not displaying the slider identifier on the display unit when the determining determines that the two sides are not parallel, and
wherein the slider identifier is displayed based on the slider pattern table and the slider data stored in the memory.

2. The graphic drawing device according to claim 1, the processes further including:
 receiving a select operation by the user with respect to a part of the drawn graphic on the display unit; and
 displaying, on the display unit, a measurement item and a measurement value thereof which correspond to the selected part of the drawn graphic.

3. The graphic drawing device according to claim 2, the processes further including:

displaying a list of plural types of measurement items corresponding to the selected part of the drawn graphic; and
displaying a selected measurement item together with a measurement value thereof on the display unit according to a select operation by the user with respect to the plural types of measurement items displayed as the list.

4. The graphic drawing device according to claim 2, the processes further including:
 displaying a list of predetermined measurement items of types respectively capable of setting to display sliders, among plural types of measurement items corresponding to the selected part of the drawn graphic;
 displaying a slider for changing the value of the displayed measurement item according to a select operation by the user with respect to the displayed slider identifier; and
 displaying a slider for changing the value of the selected measurement item according to a select operation by the user with respect to any one of the displayed measurement items as the list.

5. The graphic drawing device according to claim 2, wherein the measurement item of the type capable of setting to display a slider according to the selected part of the drawn graphic is one of: a measurement item of a length of one side in a case that the graphic part is the one side, a measurement item of an angle or a supplementary angle formed by two sides or a distance between the two sides in a case that the graphic part is the two sides, and a measurement item of a radius in a case that the graphic part is a circle.

6. The graphic drawing device according to claim 2, further comprising a key group or a touch panel,
 wherein the operation by the user is performed with respect to the key group or the touch panel.

7. The graphic drawing device according to claim 2, the processes further including:
 discriminatively displaying the selected part of the drawn graphic on the display unit.

8. A method of displaying a graphic by controlling a computer of an electronic device, the method comprising:
 displaying at least one graphic part drawn on a display unit;
 displaying, on the display unit, a measurement item which represents a type of an action of measuring the at least one graphic part drawn on the display unit;
 displaying, on the display unit, a slider identifier for setting to display a slider on the display unit according to an operation by a user after displaying the at least one graphic part drawn on the display unit, in a case that the displayed measurement item is a type capable of setting to display the slider on the display unit, the slider being a slider for changing a value of the displayed measurement item;
 displaying, on the display unit, a slider for changing the value of the displayed measurement item according to an operation by the user with respect to the displayed slider identifier; and
 changing the value of the displayed measurement item according to an operation by the user with respect to the displayed slider to thereby change the drawn graphic;
wherein the displaying the slider identifier includes:
 determining whether or not two sides of the drawn graphic are parallel lines when the displayed measurement item is a measurement item of a distance between the two sides;

displaying the slider identifier on the display unit when the determining determines that the two sides are parallel; and not displaying the slider identifier on the display unit when the determining determines that the two sides are not parallel, and wherein the slider identifier is displayed based on (i) a slider pattern table stored in a memory and (ii) slider data stored in a slider data memory area of the memory.

9. The method according to claim 8, further comprising:

receiving a select operation by the user with respect to a part of the drawn graphic on the display unit; and displaying, on the display unit, a measurement item and a measurement value thereof which correspond to the selected part of the drawn graphic.

10. The method according to claim 8, further comprising:

displaying a list of plural types of measurement items corresponding to the selected part of the drawn graphic; and displaying a selected measurement item together with a measurement value thereof on the display unit according to a select operation by the user with respect to the plural types of measurement items displayed as the list.

11. The method according to claim 10, further comprising:

displaying a list of predetermined measurement items of types respectively capable of setting to display sliders, among plural types of measurement items corresponding to the selected part of the drawn graphic;

displaying a slider for changing the value of the displayed measurement item according to a select operation by the user with respect to the displayed slider identifier; and displaying a slider for changing the value of the selected measurement item according to a select operation by the user with respect to any one of the displayed measurement items as the list.

12. The method according to claim 10, wherein the measurement item of the type capable of setting to display a slider according to the selected part of the drawn graphic is one of: a measurement item of a length of one side in a case that the graphic part is the one side, a measurement item of an angle or a supplementary angle formed by two sides or a distance between the two sides in a case that the graphic part is the two sides, and a measurement item of a radius in a case that the graphic part is a circle.

13. The method according to claim 10, wherein the operation by the user is performed with respect to a key group or a touch panel.

14. A non-transitory computer-readable storage medium having a program stored thereon which, when executed by a processor of an electronic device, controls the processor to perform operations comprising:

displaying at least one graphic part drawn on a display unit;

displaying, on the display unit, a measurement item which represents a type of an action of measuring the at least one graphic part drawn on the display unit;

displaying, on the display unit, a slider identifier for setting to display a slider on the display unit according to an operation by a user after displaying the at least one graphic part drawn on the display unit, in a case that the displayed measurement item is a type capable of setting to display the slider on the display unit, the slider being a slider for changing a value of the displayed measurement item, displaying, on the display unit, a slider for changing the value of the displayed measurement item according to an operation by the user with respect to the displayed slider identifier; and changing the value of the displayed measurement item according to an operation by the user with respect to the displayed slider to thereby change the drawn graphic;

wherein the displaying the slider identifier includes:

determining whether or not two sides of the drawn graphic are parallel lines when the displayed measurement item is a measurement item of a distance between the two sides;

displaying the slider identifier on the display unit when the determining determines that the two sides are parallel; and not displaying the slider identifier on the display unit when the determining determines that the two sides are not parallel, and wherein the slider identifier is displayed based on (i) a slider pattern table stored in a memory and (ii) slider data stored in a slider data memory area of the memory.

15. The non-transitory computer-readable storage medium according to claim 14, the operations further comprising:

receiving a select operation by the user with respect to a part of the drawn graphic on the display unit; and displaying, on the display unit, a measurement item and a measurement value thereof which correspond to the selected part of the drawn graphic.

16. The non-transitory computer-readable storage medium according to claim 15, the operations further comprising:

displaying a list of plural types of measurement items corresponding to the selected part of the drawn graphic; and displaying a selected measurement item together with a measurement value thereof on the display unit according to a select operation by the user with respect to the plural types of measurement items displayed as the list.

17. The non-transitory computer-readable storage medium according to claim 15, the operations further comprising:

displaying a list of predetermined measurement items of types respectively capable of setting to display sliders, among plural types of measurement items corresponding to the selected part of the drawn graphic;

displaying a slider for changing the value of the displayed measurement item according to a select operation by the user with respect to the displayed slider identifier; and displaying a slider for changing the value of the selected measurement item according to a select operation by the user with respect to any one of the displayed measurement items as the list.

18. The non-transitory computer-readable storage medium according to claim 15, wherein the measurement item of the type capable of setting to display a slider according to the selected part of the drawn graphic is one of: a measurement item of a length of one side in a case that the graphic part is the one side, a measurement item of an angle or a supplementary angle formed by two sides or a distance between the two sides in a case that the graphic part is the two sides, and a measurement item of a radius in a case that the graphic part is a circle.

19. The non-transitory computer-readable storage medium according to claim 15, wherein the operation by the user is performed with respect to a key group or a touch panel.

* * * * *